(12) United States Patent
Kabasawa et al.

(10) Patent No.: US 7,712,729 B2
(45) Date of Patent: May 11, 2010

(54) VAPORIZING DEVICE AND LIQUID ABSORBING MEMBER

(75) Inventors: Yasunari Kabasawa, Hanno (JP);
Daisuke Imanaka, Kawagoe (JP);
Kaoru Saito, Shiki (JP)

(73) Assignee: Casio Computer Co., Ltd., Tokyo (JP)

( * ) Notice: Subject to any disclaimer, the term of this patent is extended or adjusted under 35 U.S.C. 154(b) by 993 days.

(21) Appl. No.: 11/389,897

(22) Filed: Mar. 27, 2006

(65) Prior Publication Data

US 2006/0220267 A1 Oct. 5, 2006

(30) Foreign Application Priority Data

| Mar. 29, 2005 | (JP) | ............................. 2005-093931 |
| Mar. 29, 2005 | (JP) | ............................. 2005-093937 |
| Mar. 29, 2005 | (JP) | ............................. 2005-093938 |

(51) Int. Cl.
*B01F 3/04* (2006.01)

(52) U.S. Cl. .................... 261/142; 261/99; 261/154; 261/DIG. 65

(58) Field of Classification Search ................. 261/99, 261/104, 107, 142, 154, DIG. 65, DIG. 89
See application file for complete search history.

(56) References Cited

U.S. PATENT DOCUMENTS

| 3,492,163 | A | * | 1/1970 | Hilmer | ........................ 429/34 |
| 3,820,540 | A | * | 6/1974 | Hirtz et al | ............... 128/203.27 |
| 3,977,364 | A | * | 8/1976 | Gijsbers et al. | ............. 122/366 |
| 4,110,419 | A | * | 8/1978 | Miller | ........................ 261/142 |
| 4,216,176 | A | * | 8/1980 | Tanaka | ........................ 261/142 |
| 4,574,181 | A | * | 3/1986 | Spector | ....................... 392/390 |
| 5,078,976 | A | * | 1/1992 | Shibauchi et al. | ........... 422/298 |
| 5,432,882 | A | * | 7/1995 | Glynn | ......................... 392/392 |
| 5,916,493 | A | * | 6/1999 | Miller | ........................ 261/154 |
| 6,394,084 | B1 | * | 5/2002 | Nitta | ....................... 128/201.13 |
| 6,554,261 | B2 | * | 4/2003 | Katagiri et al. | ............... 261/154 |
| 6,601,643 | B2 | | 8/2003 | Cho et al. | |
| 6,609,560 | B2 | | 8/2003 | Cho et al. | |
| 6,644,246 | B1 | | 11/2003 | Cwik et al. | |
| 2003/0196381 | A1 | | 10/2003 | Eberspach | |
| 2004/0009104 | A1 | | 1/2004 | Kaupert et al. | |

FOREIGN PATENT DOCUMENTS

CN 1 187 605 A 7/1998

(Continued)

OTHER PUBLICATIONS

A Japanese Office Action (and English translation thereof) dated Sep. 30, 2008, issued in a counterpart Japanese Application.

(Continued)

*Primary Examiner*—Scott Bushey
(74) *Attorney, Agent, or Firm*—Frishauf, Holtz, Goodman & Chick, P.C.

(57) ABSTRACT

A vaporizing device which can vaporize fuel stably includes: a liquid absorbing member to allow liquid to move from one end portion to the other end portion of the liquid absorbing member under influence of a capillary action; and a heater to heat a side of the other end portion of the liquid absorbing member to vaporize the liquid.

17 Claims, 8 Drawing Sheets

FOREIGN PATENT DOCUMENTS

| | | |
|---|---|---|
| DE | 198 60 227 C1 | 5/2000 |
| DE | 100 42 479 A1 | 3/2002 |
| EP | 1 085 260 A | 3/2001 |
| EP | 1 354 852 A | 10/2003 |
| FR | 2 692 597 A | 12/1993 |
| JP | 57-113143 U | 12/1980 |
| JP | 61-024909 A | 2/1986 |
| JP | 63-054249 A | 3/1988 |
| JP | 03-134409 A | 6/1991 |
| JP | 10-323923 A | 12/1998 |
| JP | 10-337464 A | 12/1998 |
| JP | 11-132464 A | 5/1999 |
| JP | 2001 064658 A | 3/2001 |
| JP | 2003-035494 A | 2/2003 |
| JP | 2003-042670 A | 2/2003 |
| JP | 2004-018357 A | 1/2004 |
| TW | 526 127 B | 4/2003 |

OTHER PUBLICATIONS

Japanese Office Action (and English translation thereof) dated Apr. 15, 2008, issued in a counterpart Japanese Application.

International Search Report, dated Jan. 31, 2007 for PCT/JP2006/305758, 2 sheets.

Notification Concerning Transmittal of International Preliminary Report on Patentability, Chapter I of the Patent Cooperation Treaty, and Written Opinion of the International Searching Authority, dated Oct. 11, 2007, for PCT/JP2006/305758, 14 sheets.

Japanese Office Action dated Feb. 3, 2009 (2 pages), and English translation thereof (3 pages), issued in counterpart Japanese Application Serial No. 2005-093937.

Japanese Office Action dated Feb. 10, 2009 (3 pages), and English translation thereof (5 pages), issued in counterpart Japanese Application Serial No. 2005-093938.

* cited by examiner

VAPORIZING DEVICE AND LIQUID ABSORBING MEMBER

CROSS-REFERENCE TO RELATED APPLICATIONS

This application is based upon and claims the benefit of priority from the prior Japanese Patent Application No. 2005-093931, filed on Mar. 29, 2005, prior Japanese Patent Application No. 2005-093937, filed on Mar. 29, 2005, and prior Japanese Patent Application No. 2005-093938, filed on Mar. 29, 2005, and the entire contents of which are incorporated herein by reference.

BACKGROUND OF THE INVENTION

1. Field of the Invention

The present invention relates to a vaporizing device to vaporize liquid, and a liquid absorbing member used therein.

2. Background of the Invention

In recent years, there have been seen vigorous studies and developments for fuel batteries to realize high energy use efficiency. The fuel battery makes fuel react with oxygen contained in ambient air electrochemically and takes out electric energy directly from chemical energy. The fuel batteries have been placed as a promising energy source. As for a fuel for used in the fuel battery, hydrogen can be mentioned. However, there is a problem that since hydrogen takes a gaseous state at ambient temperatures, it has difficulty in handling and storage. When a liquid fuel such as alcohols and gasoline is used, a system for storing the liquid fuel can be made comparably small in size, but the fuel and water vapor must be heated to a high temperature for reaction to create hydrogen which is used to generate electricity.

For example, in Japanese Laid-open Patent Specification No. 2004-18357, in order to create hydrogen from the liquid fuel and water, a technique in which the liquid fuel and water are vaporized in an evaporating apparatus, and a gas mixture of the liquid fuel and water supplied from the evaporating apparatus is reformed into hydrogen in a reformer, is disclosed.

However, as a vaporizing apparatus is made smaller in size, it becomes more difficult to vaporize fuel steadily or quantitatively.

SUMMARY OF THE INVENTION

The present invention has been made to solve the above problem and has an object to steadily vaporize fuel in a vaporizing device.

In order to solve the above problem, a vaporizing device of the present invention comprises: a liquid absorbing member to allow liquid to move from one end portion to the other end portion of the liquid absorbing member under influence of a capillary action; and a heater to heat the side of the other end portion of the liquid absorbing member to vaporize the liquid.

Preferably, the liquid absorbing member has one of a felt core, a ceramic porous core, and a fiber core.

Preferably, the liquid absorbing member has a closely overlapping unit to cover a peripheral surface of the liquid absorbing member and to leave the one end portion and the other end portion of the liquid absorbing member exposed.

Preferably, the closely overlapping unit has elasticity.

Preferably, the closely overlapping unit has heat shrinkability.

Preferably, the liquid absorbing member is made of a material having heat conductivity of 0.5 W/m·K or less.

Another vaporizing device of the present invention comprises: a liquid absorbing member to allow liquid to move from one end portion to the other end portion of the liquid absorbing member under influence of a capillary action; and an electrically heating wire to heat the side of the other end portion of the liquid absorbing member to vaporize the liquid.

Another vaporizing device of the present invention comprises: a liquid absorbing member to allow liquid to move from one end portion to the other end portion of the liquid absorbing member under influence of a capillary action; a heater to heat the side of the other end portion of the liquid absorbing member to vaporize the liquid; and a gas permeable film provided at the other end portion of the liquid absorbing member.

Preferably, the gas permeable film includes polytetrafluoroethylene or polyvinylidene-fluoride.

A liquid absorbing member of the present invention comprises: an elastic closely overlapping unit which exposes the liquid absorbing member at one end portion and the other end portion, and allows liquid to move from the one end portion to the other end portion of the liquid absorbing member under influence of a capillary action.

Preferably, the closely overlapping unit has heat shrinkability.

Preferably, the liquid absorbing member includes a material having heat conductivity of 0.5 W/m·K or less.

Another liquid absorbing member of the present invention comprises: a gas permeable film which allows liquid that moves from one end portion to the other end portion of the liquid absorbing member under influence of a capillary action, to penetrate through in a gaseous state.

Preferably, the gas permeable film includes polytetrafluoroethylene or polyvinylidene-fluoride.

According to the present invention, the heater can heat the liquid that moves from the one end portion of to the other end portion of the liquid absorbing member, and vaporize the liquid stably.

Additionally, the vaporizing device of the present invention comprises: a liquid absorbing member to allow liquid to move from one end portion to the other end portion of the liquid absorbing member under influence of a capillary action; a case to house the liquid absorbing member; and a pressure controlling section to regulate a difference between a pressure at the side of one end portion of the liquid absorbing member and a pressure at the side of the other end portion of the liquid absorbing member to be constant.

The liquid may include fuel, or fuel and water.

The pressure controlling section may regulate pressure at the side of the one end portion of the liquid absorbing member and the pressure at the side of the other end portion of the liquid absorbing member to be equivalent with each other.

Preferably, the vaporizing device further comprises a supplying section to supply liquid to the side of the one end portion of the liquid absorbing member; and a measuring section to measure the pressure at the side of the one end portion of the liquid absorbing member and the pressure at the side of the other end portion of the liquid absorbing member.

The measuring section may measure a pressure applied to liquid at the side of the one end portion of the liquid absorbing member and a pressure of gas at the side of the other end portion of the liquid absorbing member.

A vaporizing method of the present invention comprises a step to keep a difference between two pressures constant, wherein the two pressures are a pressure at the side of the one end portion of a liquid absorbing member and a pressure at the side of the other end portion of the liquid absorbing member, which allows liquid to move from one end portion to the other end portion of the liquid absorbing member under influence of a capillary action.

A pressure applied to liquid at the side of the one end portion of the liquid absorbing member and a pressure of gas at the side of the other end portion of the liquid absorbing member may be measured, and the pressure applied to liquid at the side of the one end portion of the liquid absorbing member may be regulated so that the difference between the pressure at the side of the one end portion of the liquid absorbing member and the pressure at the side of the other end portion of the liquid absorbing member is kept constant.

The pressure at the side of the one end portion of the liquid absorbing member and the pressure at the side of the other end portion of the liquid absorbing member may be made to be equivalent with each other.

According to the present invention, vaporization of liquid can be performed stably or quantitatively.

A vaporizing device of the present invention comprises: a liquid absorbing member to allow liquid to move from one end portion to the other end portion of the liquid absorbing member under influence of a capillary action; and a case to house the liquid absorbing member with a cavity left at the one end portion of the liquid absorbing member.

Preferably, a cross-sectional area of the cavity is larger than an area of end surface of one end portion of the liquid absorbing member.

Preferably, the case is provided with an introduction hole leading to the cavity, and a cross-sectional area of the introduction hole is smaller than a cross-sectional area of the cavity.

A vaporizing device of the present invention comprises: a liquid absorbing member to allow liquid to move from one end portion to the other end portion of the liquid absorbing member under influence of a capillary action; and a case to house the liquid absorbing member with a cavity left at the one end portion of the liquid absorbing member, wherein the case is provided with an introduction hole leading to the cavity, a cross-sectional area of the cavity is larger than an area of end surface of one end portion of the liquid absorbing member, and a cross-sectional area of the introduction hole is smaller than the cross-sectional area of the cavity.

DETAILED DESCRIPTION OF THE PREFERRED EMBODIMENTS

Here, preferred embodiments of the present invention will be described with reference to the accompanying drawings. Although various kinds of preferred technical restrictions are added to the embodiments described hereinafter, the embodiments shall by no means restrict the scope of the invention to the embodiments and drawings described below.

Figure 1:
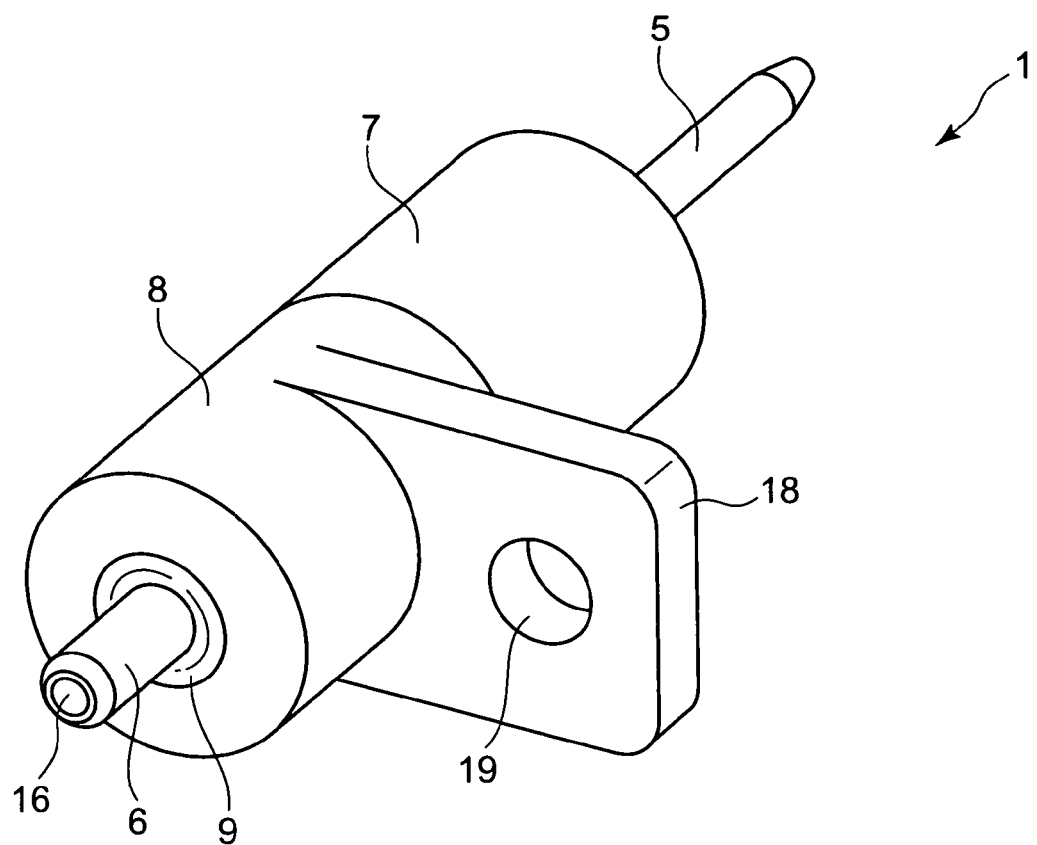
FIG. 1 is a perspective view of a vaporizing device 1.
Figure 2:
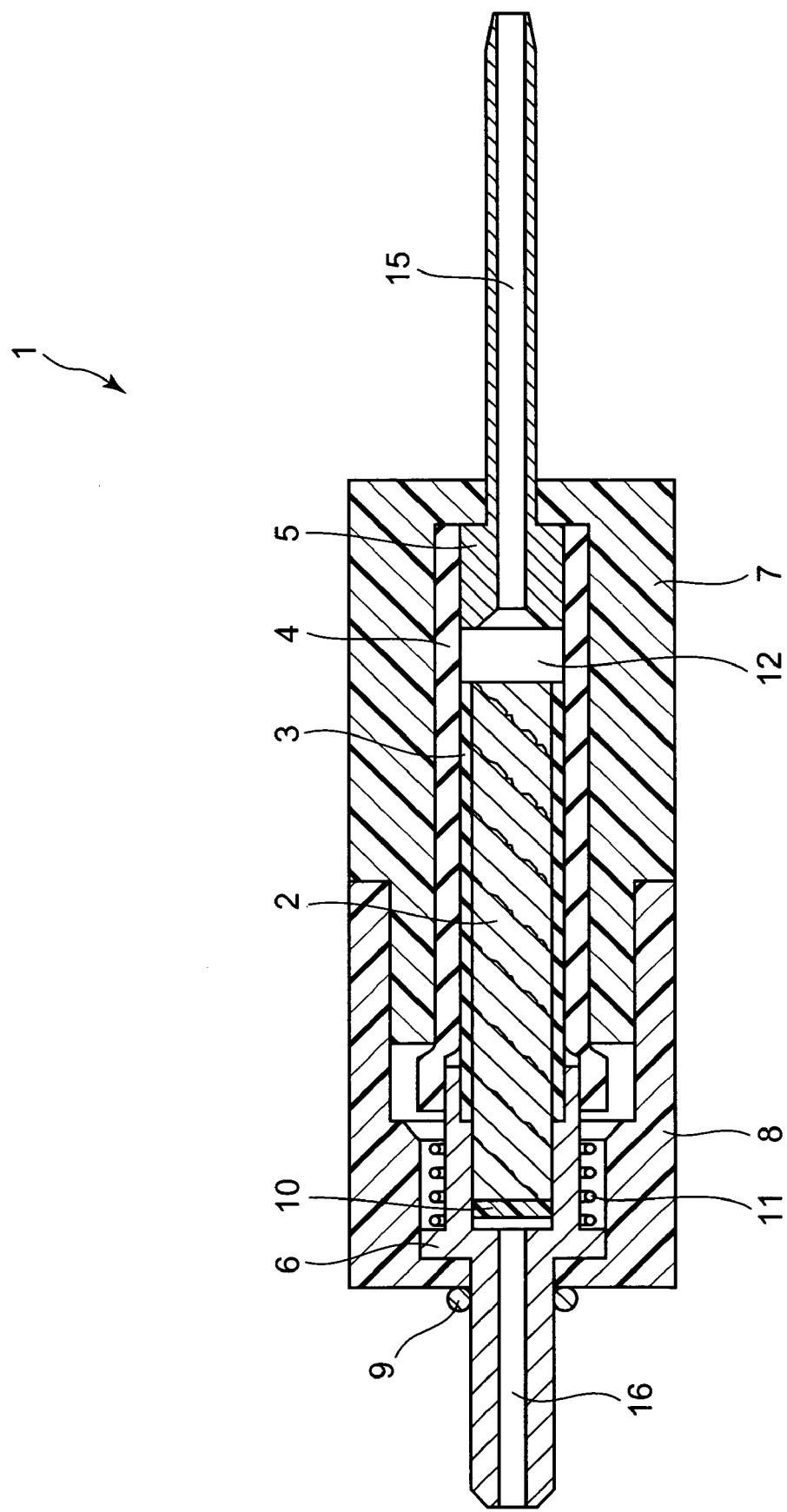
FIG. 2 is a cross-sectional view of the vaporizing device 1.

FIG. 1 is a perspective view illustrating a vaporizing device 1, and FIG. 2 is a cross-sectional view of the vaporizing device 1 taken along its central line.

As illustrated in FIGS. 1 and 2, the vaporizing device 1 comprises a liquid absorbing member 2 having nature of absorbing liquid therein, an internal tube 3 partially covering the peripheral surface of the liquid absorbing member 2, an external tube 4 covering the peripheral surface of the internal tube 3, an inlet nipple 5 through which liquid flows into the liquid absorbing member 2, an outlet nipple 6 through which the liquid absorbed in the liquid absorbing member 2 flows out in a vaporized state, an approximate tube-shaped inlet case 7, an approximate tube-shaped outlet case 8, an o-ring 9 to seal a clearance formed between the outlet nipple 6 and outlet case 8, a gas permeable film 10 with moisture permeability, and a heating coil 11 to heat the liquid absorbed in the liquid absorbing member 2 to the extent that the liquid vaporize.

The liquid absorbing member 2 is a core material in the shape of a rod, more specifically, of a column shape. The liquid absorbing member 2 is inserted into the internal tube 3 with the external peripheral surface kept close to the inner peripheral surface of the internal tube 3. The liquid absorbing member 2 is longer than the internal tube 3. One end surface of the liquid absorbing member 2 aligns with one end portion of the internal tube 3 or sticks out of the one end portion of the internal tube 3, and the other end surface of the liquid absorbing member 2 sticks out of the other end portion of the internal tube 3. The gas permeable film 10 is formed on the other end surface of the liquid absorbing member 2. The internal tube 3 serves so as to keep the liquid absorbing member 2 from breaking apart, when the liquid absorbing member 2 is handled, and also to protect the same from getting dirty.

The liquid absorbing member 2 is inserted into the external tube 4 with the internal tube 3 interposed between them, and the external tube 4 is kept close to the internal tube 3. One end surface of the liquid absorbing member 2 is placed inside the one end portion of the external tube 4, and the other end surface of the liquid absorbing member 2 sticks out of the other end portion of the external tube 4.

A part of the tube-shaped inlet nipple 5 is pressed into one end portion of the external tube 4 with a clearance left between the inlet nipple 5 and the liquid absorbing member 2. As a result, a cavity 12 is formed between the inlet nipple 5 and liquid absorbing member 2. The external diameter of the inlet nipple 5, concerning the portion which has been pressed into the external tube 4, is approximately equivalent to an external diameter of the internal tube 3 with the liquid absorbing member 2 inserted therein, and is also approximately equivalent to a diameter of the cavity 12 (internal diameter of the external tube 4). In case where either of the liquid absorbing member 2 or internal tube 3, or both of them have elasticity, the liquid absorbing section 2 can be easily inserted into the external tube 4. The cavity 12 is slightly larger in diameter than the liquid absorbing member 2 by an amount equivalent to wall thickness of the internal tube 3, and the cross-sectional area of the cavity 12 which is parallel to the one end surface of the liquid absorbing member 2 is larger than the one end surface of the liquid absorbing member 2. In case the liquid absorbing member 2 absorbs liquid, the lateral side of the liquid absorbing member 2 swells in the direction of diameter, whereby a clearance between the internal tube 3 and the external tube 4 is eliminated, and displacement of the internal tube 3 with respect to the external tube 4 is prevented. Therefore, the cavity 12 will not be eliminated due to displacement of the liquid absorbing member 2.

The inlet nipple 5 is provided with an introduction hole 15 along its central line, and the introduction hole 15 penetrates through the inlet nipple 5 from front end to the other side of the inlet nipple 5. The diameter of the introduction hole 15 is smaller than the diameter of the cavity 12 and is also smaller than the diameter of the liquid absorbing member 2. The cross-sectional area of the cavity 12 which is parallel to the one end surface of the liquid absorbing member 2 is larger than the cross-sectional area of the introduction hole 15.

The end portion of the liquid absorbing member 2, which is provided with the gas permeable film 10, is pressed into the tube-shaped outlet nipple 6. One end portion of the internal tube 3 is also inserted into the outlet nipple 6, and is sandwiched between the outlet nipple 6 and liquid absorbing member 2. In addition, an introduction portion of the outlet nipple 6 is inserted into the other end portion of the external tube 4, whereby the external tube 4 connects the outlet nipple 6 and the inlet nipple 5 by means of the liquid absorbing member 2.

The outlet nipple 6 is provided with a discharge hole 16 along its central line, and the discharge hole 16 extends from the front end of the outlet nipple 6 to a hollow where the liquid absorbing member 2 is inserted.

On the portion of the outlet nipple 6 where the liquid absorbing member 2 is pressed into, a heating coil 11 is wounded around. The portion of the outlet nipple 6 where the liquid absorbing member 2 is pressed into is formed in a flange.

A cylindrically-shaped inlet case 7 receives in its hollow the external tube 4, internal tube 3, and inlet nipple 5. A part of the external tube 4 is sandwiched between the inlet case 7 and inlet nipple 5. A part of the external tube 4 and a part of the internal tube 3 are sandwiched between the inlet case 7 and the liquid absorbing member 2. A small hole leading to the hollow is formed at one end surface of the inlet case 7, through which hole the front end of the inlet nipple 5 sticks out of the one end surface of the inlet case 7.

A cylindrically-shaped outlet case 8 receives in its hollow the external tube 4, internal tube 3, liquid absorbing member 2, heating coil 11, and inlet case 7. A small hole leading to the hollow is formed at one end surface of the outlet case 8, through which hole the front end of the outlet nipple 6 sticks out of the one end surface of the outlet case 8. The portion of the outlet nipple 6 which is sticking out is inserted in the o-ring 9, which serves to seal at the one end surface of the outlet case 8.

The outlet case 8 is provided on its peripheral surface with a fixing unit 18. The fixing unit 18 is formed with a screw hole 19 to screw shut.

Next, materials and material qualities of the liquid absorbing member 2, internal tube 3, external tube 4, inlet nipple 5, outlet nipple 6, inlet case 7, outlet case 8, o-ring 9, gas permeable film 10, and the heating coil 11 will be described.

The liquid absorbing member 2 has minute holes formed inside, and is capable of absorbing liquid. The liquid absorbing member 2 has heat-resistance at least up to the boiling-point of the liquid which is imported therein. A felt core, ceramic porous core, fiber core, and the like can be mentioned as the material used for the liquid absorbing member 2. As for the materials of the felt core, chemical fiber felt, heat-resistant fiber felt, needle felt, resin finishing felt, formed felt, wool felt and the like can be applied. Examples of the fiber core include inorganic fiber (for example, glass fiber and asbestos) or organic fiber (for example, organic resin formed as fiber). As for the ceramic porous core, inorganic powder (for example, aluminum compound, and silicon compound) which is sintered into a porous material, and inorganic powder which is coagulated with a binding material can be used. The liquid absorbing member 2 preferably has an affinity for fuel liquid such as water and ethanol.

The heating coil 11 comprises an electric heating material, and generates heat using electricity. For instance, a nickel-cobalt wire subjected to an oxide coating treatment can be used as the heating coil 11.

The liquid absorbing member 2 is heated at the other end surface which in on discharging side, by the heating coil 11, but it is preferable that the whole body of the liquid absorbing member 2 is not warmed up but only the portion of the liquid absorbing member 2 which is heated becomes warm locally. Therefore, it is preferable that such structure is reluctant to release heat. More specifically, it is preferable that a material (bulk material) of the liquid absorbing member 2 has thermal conductivity of 0.5 W/m·K or less.

It is preferable that the internal tube 3 has rubber elasticity, and may have heat shrinkability. Further, it is preferable that the internal tube 3 in a natural state, in which the internal tube 3 is not inserted with liquid absorbing member 2, has an inner diameter smaller than the diameter of the liquid absorbing member 2, and the inner diameter of the internal tube 3 increases by insertion of the liquid absorbing member 2. Examples of the internal tube 3 are a tube of radiation cross-linking flexible polyolefin resin (Sumitube A, manufactured by Sumitomo Electric), a tube of polyolefin (HSTT, manufactured by Panduit Corp.), or a tube of fluorine resin (TFE-2X, TFE-2XSPSW19, TFE-2XSPSW 13, manufactured by Hagitec).

The external tube 4 has rubber elasticity. Here, the liquid absorbing member 2 held in the internal tube 3 is inserted into the external tube 4. However, the liquid absorbing member 2 can also be inserted directly into the external tube 4 without using the internal tube 3. In this case, it is preferable that the external tube 4 has heat shrinkability.

The inlet nipple 5 can be made of a resin, a metal, or ceramic.

It is preferable that the outlet nipple 6 is made of a metal having thermal conductivity of 100 W/m·K or higher, to conduct heat easily from the heating coil 11 to the liquid absorbing member 2. As for the material of the outlet nipple 6, for example, copper (in the case of pure copper, thermal conductivity is 380 W/m·K), copper alloy (in the case of brass, thermal conductivity is 146 W/m·K), and aluminum alloy (in the case of aluminum, thermal conductivity is 230 W/m·K) can be mentioned. The surface of the outlet nipple 6 can be applied with a nickel plating treatment.

It is preferable that the inlet case 7 and outlet case 8 have low heat conductivity and heat resistance to prevent heat generated by the heating coil 11 from being released outside. Therefore, the heat conductivity is preferably 0.5 W/m·K or less. Examples of materials of the inlet case 7 and outlet case 8 are PPS (PolyPhenylene Sulfide), PEEK (PolyEtherEtherKetone), PES (PolyEtherSulfone), PBI (PolyBenzImidazole), and the like. The heat resistance temperature (deflection temperature under load 1.82 MPa) and heat conductivity of PPS, PEEK, PES and PBI are given in the following Table 1.

TABLE 1

| Material | Heat resistance temperature (deflection temperature under load 1.82 MPa (° C.)) | Heat conductivity (W/m · K) |
|---|---|---|
| PPS | 108 | 0.33 |
| PEEK | 140 | 0.25 |
| PES | 203 | 0.18 |
| PBI | 435 | 0.40 |

The gas permeable film 10 has hydrophobic property on the surface, and contains minute holes inside, whereby the film 10 is given a property that does not allow liquid to penetrate through the film 10 but allows gas to penetrate through the film 10. As for examples of material used for the gas permeable film 10, PTFE (PolyTetraFluoroEthylene) and PVDF (PolyVinyliDeneFluoride) can be mentioned. In case where the gas permeable film 10 is made of PTFE, it became clear through an experiment that PTFE film allows gas (vapor) to penetrate through, where thickness of the film is 200 µm and average pore diameter is 5 µm. Meanwhile, PTFE thin film with thickness of 135 µm and average pore diameter of 1.2 µm does not allow gas to penetrate through. In addition, PTFE thin film with thickness of 172 µm and average pore diameter of 3 µm also does not allow gas to penetrate through. Therefore, it is preferable that the average pore diameter of the gas permeable film 10 is 5 µm or larger.

Next, operation of the vaporizing device 1 will be described.

When a voltage is applied to the heating coil 11, the heating coil 11 generates heat. In case liquid is fed into the introduction hole 15 in this state, the liquid pools in the cavity 12, and becomes absorbed by the liquid absorbing member 2 through its one end surface. The liquid absorbed through the one end surface is sucked toward the other end surface by capillary action and is vaporized by heat of the heating coil 11. The gas vaporized at the end portion of the discharging side of the liquid absorbing member 2 penetrates through the gas permeable film 10, and is discharged outside through the discharge hole 16. In case a pressure of the liquid to be supplied is made equivalent to a pressure of the discharged gas, amount of liquid becoming vaporized per unit time increases, and even in case where the pressure of the liquid or the pressure of the gas is changed, the amount of liquid becoming vaporized per unit time is kept almost constant. Therefore, it is preferable to measure the pressure of the discharged gas and the pressure of the supplied liquid and to adjust the pressure of the discharged gas and the pressure of the supplied liquid by flow rate control unit, according to the measured values so that the pressure of the discharged gas is kept equal to the pressure of the supplied liquid.

Air bubbles may be contained in the liquid supplied through the introduction hole 15. However, since the cross-sectional area of the cavity 12 formed between the introduction hole 15 and the one end surface of the liquid absorbing member 2 is larger than the area of the one end surface of the liquid absorbing member 2, the air bubbles are diffused inside the cavity 12. Therefore, the one end surface of the liquid absorbing member 2 is not covered entirely with the air bubbles, and the liquid absorbing member 2 is not prevented from absorbing the liquid.

Since the air bubbles accumulated in the cavity 12 are not absorbed into the liquid absorbing member 2 as fast as the liquid, the air bubbles burst in the cavity 12, or gets gradually absorbed into the liquid absorbing member 2 and becomes discharged from the discharge hole 16 provided at the opposite side. The cavity 12 serves as a buffer for temporarily storing the air bubbles. Since the cross-sectional area of the introduction hole 15 is smaller than that of the cavity 12, a rate at which the air bubbles are stored in the cavity 12 is lower than a rate at which the air bubbles are absorbed into the liquid absorbing member 2 through its one end surface. Therefore, the one end surface of the liquid absorbing member 2 is not covered entirely with the air bubbles, and therefore even in case the air bubbles are sucked by the one end surface, the liquid absorbing member 2 is not prevented from absorbing the liquid. Consequently, the liquid absorbing member 2 is prevented from ceasing the vaporization of the fuel.

Since the liquid is vaporized inside the liquid absorbing member 2 provided with minute holes, abrupt boiling of the liquid can be suppressed. Particularly, since the other end portion at discharging side of the liquid absorbing member 2 is heated by the heating coil 11 and the liquid absorbing member 2 has low heat conductivity, the liquid is vaporized neither in the middle portion nor in one end portion at the introduction side of the liquid absorbing member 2, but is vaporized at the other end portion at the discharging side of the liquid absorbing member 2. In case a gas is generated in the middle portion or in the one end portion at the introduction side of the liquid absorbing member 2, the pressure of the generated gas reduces liquid absorbability by capillary action of the liquid absorbing member 2. However, such disadvantage can be prevented.

In addition, the heating coil 11 does not contact the liquid absorbing member 2 directly, and the outlet nipple 6 is provided between the heating coil 11 and the liquid absorbing member 2. Therefore, the liquid absorbing member 2 is not heated locally, and the liquid absorbing member 2 is prevented from being damaged locally by heat.

Since the liquid absorbing member 2 is inserted into the internal tube 3 and the internal tube 3 is kept in close contact with the liquid absorbing member 2, the gas generated inside the liquid absorbing member 2 does not burst out from the peripheral surface of the liquid absorbing member 2. Therefore, the gas is prevented from bursting out toward the one end surface of the liquid absorbing member 2, through a clearance between the peripheral surface of the liquid absorbing member 2 and the internal tube 3.

Further, since the liquid absorbing member 2 is inserted into the internal tube 3, the liquid contacts directly with the liquid absorbing member 2 only at its one end surface on the rearward side, and the liquid absorbability of the liquid absorbing member 2 increases at the one end surface on the rearward side. In addition, the gas generated in the other end surface at the discharging side (discharge hole 16) of the liquid absorbing member 2 is prevented from returning to the introduction side (introduction hole 15). Since the internal tube 3 allows both end portions of the liquid absorbing member 2 to be exposed, and covers the peripheral surface of the liquid absorbing member 2 in close contact, a clearance where a capillary action can occur is not left between the peripheral surface of the liquid absorbing member 2 and the internal tube 3. Therefore, the gas inside the liquid absorbing member 2 is prevented from moving toward the peripheral surface of the liquid absorbing member 2 to return to the introduction side along the clearance, and is also prevented from remaining in the clearance. Consequently, the gas inside the liquid absorbing member 2 is pushed out from the introduction side to the discharging side by the liquid moving under influence of capillary action. Specifically, since the internal tube 3 has heat shrinkability, adhesion of the internal tube 3 to the liquid absorbing member 2 is enhanced by heat of the heating coil 11, whereby the advantages of the above arrangement become prominent.

In addition, since the external tube 4 is sandwiched between the inlet case 7 and the liquid absorbing member 2, air-tightness and water-tightness of the inlet case 7 are ensured by the external tube 4. The inlet nipple 5 and the outlet nipple 6 are pressed into both end portions of the external tube 4, respectively. Therefore, the liquid supplied from the introduction hole 15 can be vaporized and the gas can be discharged through the discharge hole 16 even in the absence of the inlet case 7 and outlet case 8. However, the air-tightness and water-tightness are further enhanced and heat loss is also reduced by existence of the inlet case 7 and outlet case 8. In particular, since the inlet case 7 and the outlet case 8 are made of a material having low heat conductivity and heat resistance, heat loss can be suppressed.

Further, since the gas permeable film 10 is formed on the other end surface at the discharging side of the liquid absorbing member 2, the liquid does not ooze out from the gas permeable film 10 toward the discharge hole 16, and scattering of the liquid due to abrupt boiling is prevented particularly.

Examples of application of the vaporizing device 1 will be described with reference to FIGS. 3 and 4.

Figure 3:
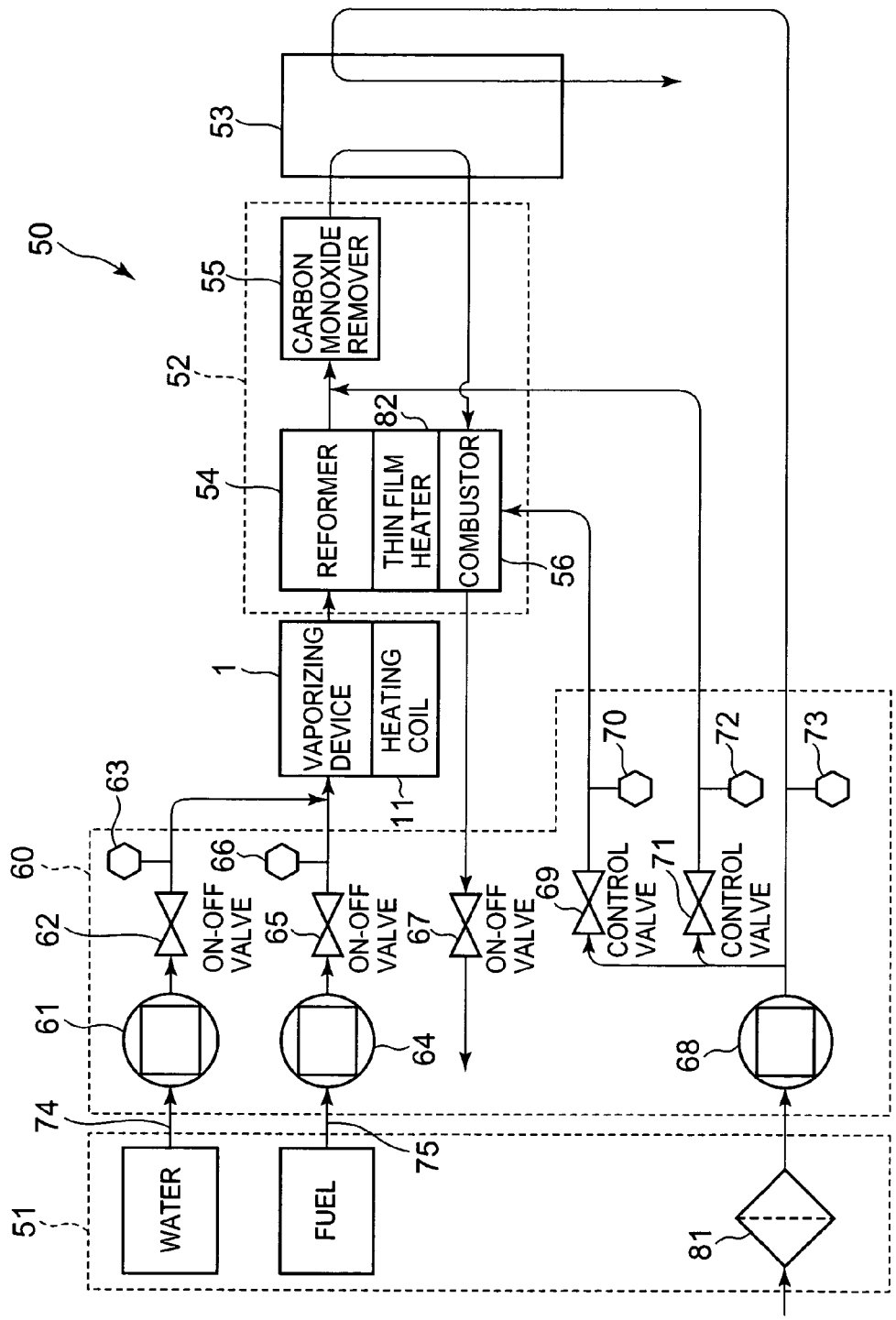
FIG. 3 is a block diagram of power generating device 50 using the vaporizing device 1.
Figure 4:
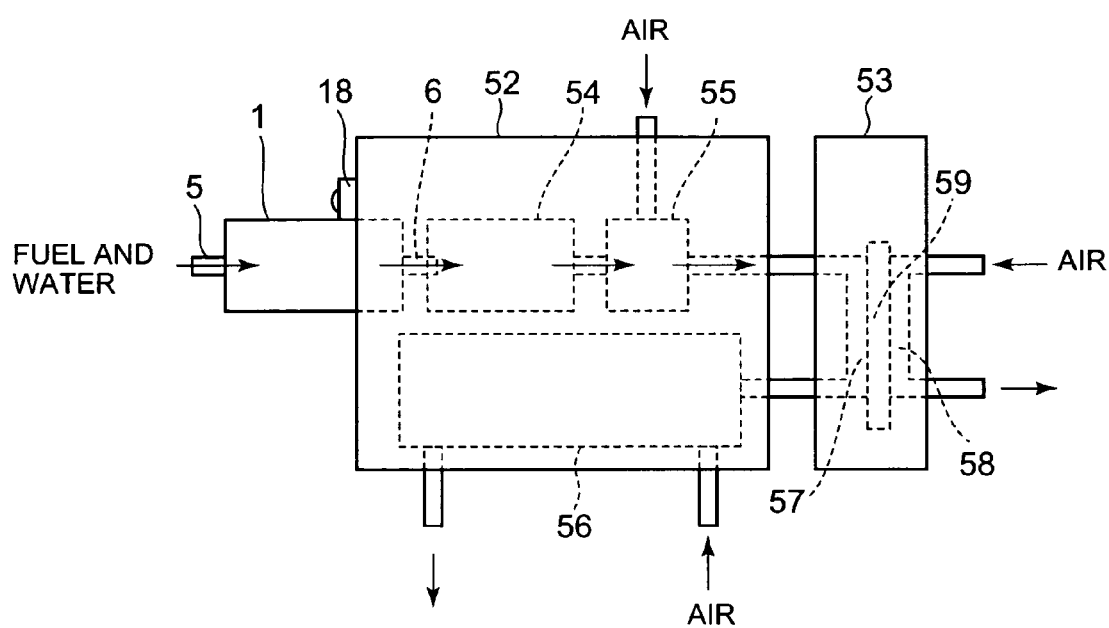
FIG. 4 is a schematic view showing the vaporizing device 1, micro-reactor 52 and fuel battery 53.

FIG. 3 is a block diagram showing power generating device 50 using the vaporizing device 1. FIG. 4 is a schematic view showing the vaporizing device 1, micro-reactor 52, and fuel battery 53.

The power generating device 50 comprises a fuel reservoir 51, the micro-reactor 52, fuel battery 53 and fluid equipment 60 in addition to the vaporizing device 1.

The micro-reactor 52 has a reformer 54, a carbon monoxide remover 55, and a combustor 56 built in. When the vaporizing device 1 is loaded to the micro-reactor 52, the outlet nipple 6 reaches the reformer 54.

In the fuel reservoir 51, water and liquid fuel (for example, alcohols such as methanol and ethanol, or gasoline) are stored separately. The fuel reservoir 51 is provided with an air filter 81. In the following description, it is assumed that methanol is used as the fuel.

The fluid device 60 comprises pumps 61, 64, 68, ON-OFF valves 62, 65, control valves 69, 71, and flow sensors 63, 66, 70, 72, 73. Further, the fluid device 60 is provided with an introduction pipe 74 connected to a water drain outlet of the fuel reservoir 51 and an introduction pipe 75 connected to a fuel drain outlet of the fuel reservoir 51.

The pump 61 sucks water from the fuel reservoir 51 and sends water to the vaporizing device 1. The ON-OFF valve 62 controls ceasing and/or starting of water flow, and the flow sensor 63 measures a flow rate of the water. The pump 64 sucks liquid fuel from the fuel reservoir 51 and sends liquid fuel to the vaporizing device 1. The ON-OFF valve 65 controls ceasing and/or starting of liquid fuel flow and the flow sensor 66 measures a flow rate of the liquid fuel. The vaporizing device 1 is supplied with water and liquid fuel in a mixed state.

The pump 68 serves to suck air from the outside through the air filter 81, and supply air to the combustor 56, carbon monoxide remover 55, and an air pole 58 of the fuel battery 53. A flow rate of air supplied to the combustor 56 is measured by the flow sensor 70 and controlled by the control valve 69. A flow rate of air supplied to the carbon monoxide remover 55 is measured by the flow sensor 72 and controlled by the control valve 71. A flow rate of air supplied to the fuel battery 53 is measured by the flow sensor 73.

ON-OFF valve 67 serves to control ceasing and/or starting of an emission flow from the combustor 56.

A liquid mixture of fuel liquid and water is supplied to the vaporizing device 1, and is vaporized in the liquid absorbing member 2 of the vaporizing device 1. The gas mixture of vaporized liquid fuel and water is further supplied to the reformer 54. The outlet nipple 6 of high heat conductivity is heated by the heating coil 11, and the outlet nipple 6 also reaches the reformer 54. Therefore, the gas mixture of vaporized liquid and water is prevented from returning to a liquid state before being sent to the reformer 54. Here, since the inlet nipple 5 reaches the reformer 54 and heat is conducted from the reformer 54 to the inlet nipple 5 to heat the other end portion at discharging side of the liquid absorbing member 2, the heating coil 11 may be omitted.

In the reformer 54, the gas mixture of fuel and water supplied from the vaporizing device 1 is reformed into hydrogen in the presence of a catalyst, as shown by the following chemical equations (1) and (2). A gas mixture of products generated at the reformer 54 is supplied to the carbon monoxide remover 55, and air is also supplied to the carbon monoxide remover 55 from the pump 68. In the carbon monoxide remover 55, the carbon monoxide contained in the gas mixture is selectively oxidized in the presence of a catalyst as shown by chemical equation (3). The micro-reactor 52 is provided with a thin film heater 82 made of an electric heating material. The reformer 54 and carbon monoxide remover 55 are heated by the thin film heater 82.

$$CH_3OH + H_2O \rightarrow 3H_2 + CO_2 \tag{1}$$

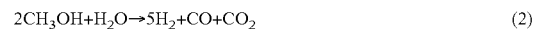

$$2CH_3OH + H_2O \rightarrow 5H_2 + CO + CO_2 \tag{2}$$

$$2CO + O_2 \rightarrow 2CO_2 \tag{3}$$

The fuel battery 53 is provided with a fuel pole 57 holding catalytic agent particles, air pole 58 holding catalytic agent particles, and a solid polymer electrolyte membrane 59 intervening between the fuel pole 57 and the air pole 58. The fuel pole 57 is supplied with the gas mixture from the carbon monoxide remover 55. The air pole 58 is supplied with air from the pump 68. At the fuel pole 57, hydrogen contained in the gas mixture is separated into hydrogen ions and electrons by catalytic action of the catalytic agent particles as shown by chemical equation (4). Hydrogen ions are conducted to the oxygen pole 58 through the solid polymer electrolyte membrane 59, and electrons are taken out from the fuel pole 57. At the oxygen pole 58, electrons, oxygen ions, and hydrogen ions react to produce water as shown by chemical equation (5). Consequently, electric energy is generated by the fuel battery 53. Here, water may be supplied to the fuel pole 57 and oxygen pole 58 from the pump 61.

$$H_2 \rightarrow 2H^+ + 2e^- \tag{4}$$

$$2H^+ + \tfrac{1}{2}O_2 + 2e^- \rightarrow H_2O \tag{5}$$

Off-gas, containing hydrogen which did not go under reaction at the fuel pole 57, is supplied to the combustor 56. In the combustor 56, oxygen contained in air supplied from the pump 68 and unreacted hydrogen react in the presence of a catalyst to generate combustion heat. The combustion heat is used to help reaction at the reformer 54 and the carbon monoxide remover 55. Discharging gas of the combustor 56 is discharged outside through ON-OFF valve 67.

Figure 5:
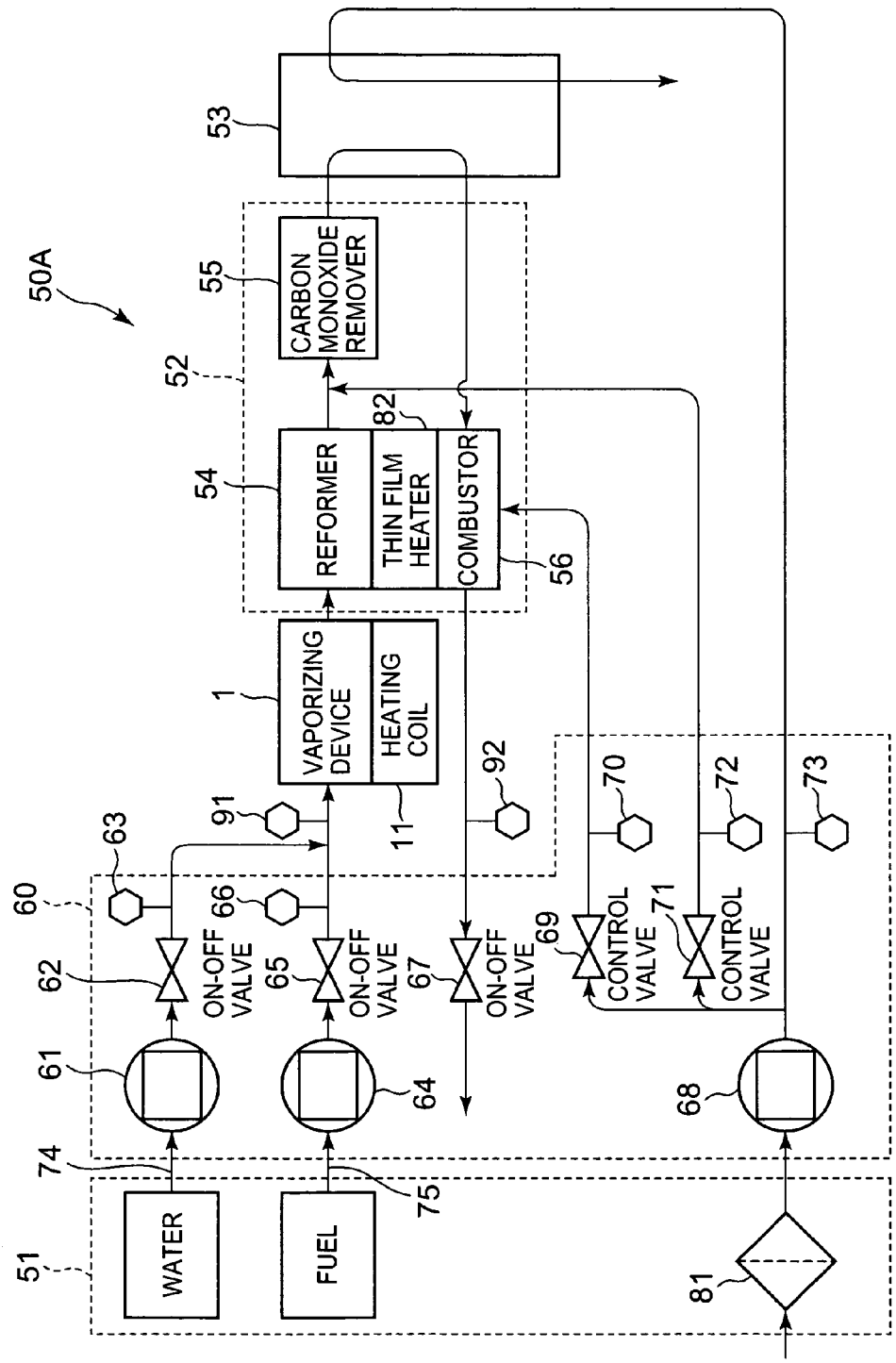
FIG. 5 is a block diagram of power generating device 50A using the vaporizing device 1.

FIG. 5 is a block diagram showing power generating device 50A. In FIG. 5, elements of the power generating device 50A that are identical to those of the power generating device 50 shown in FIG. 3 are designated by the same reference numerals.

In the power generating device 50A, a pressure sensor 91 is connected to the inlet nipple 5 of the vaporizing device 1 to measure a pressure of the liquid mixture supplied to the inlet nipple of the vaporizing device 1, and a pressure sensor 92 is provided between the combustor 56 and ON-OFF valve 67 to measure a pressure of the discharging gas from the combustor 56. The outlet nipple 6 of the vaporizing device 1 and the pressure sensor 92 are connected through the combustor 56, the fuel pole 57 of the fuel battery 53, the carbon monoxide remover 55, and reformer 54. Therefore, the pressure sensor 92 serves to substantially measure a pressure of the gas mixture discharged from the outlet nipple 6 of the vaporizing device 1.

The pressure sensor 91 and pressure sensor 92 each converts displacement of a built-in diaphragm into an electric signal using a voltage element or electrostatic capacity, to detect a pressure.

The power generating device 50A is provided with a control circuit to control the pumps 61 and 64. Being controlled by the control circuit, the pumps 61 and 64 regulate liquid flow rate of water and liquid fuel, thereby regulating the pressure of the liquid mixture to be supplied to the vaporizing device 1. Here, the control circuit also serves as a control circuit for the vaporizing device 1. The pumps 61 and 64 serve as supplying section of the vaporizing device 1, and the pressure sensor 92 serves as measuring section of the vaporizing device 1.

Pressure signals measured by the pressure sensor 91 and pressure sensor 92 are fed back to the control circuit. The control circuit regulates pressures of liquid mixtures by the pumps 61 and 64 based on the pressure signals fed back thereto, so that the pressure of the liquid mixture supplied to the vaporizing device 1 becomes equivalent to the pressure of the gas mixture supplied from the vaporizing device 1 to the reformer 54. Specifically, the control circuit controls the pumps 61 and 64 to reduce liquid flow rate, in case the pressure measured by the pressure sensor 91 is much larger than or exceeds the pressure measured by the pressure sensor 92. Meanwhile, the control circuit controls the pumps 61 and 64 to increase liquid flow rate, in case the pressure measured by the pressure sensor 91 becomes smaller than the pressure measured by the pressure sensor 92.

Figure 6:
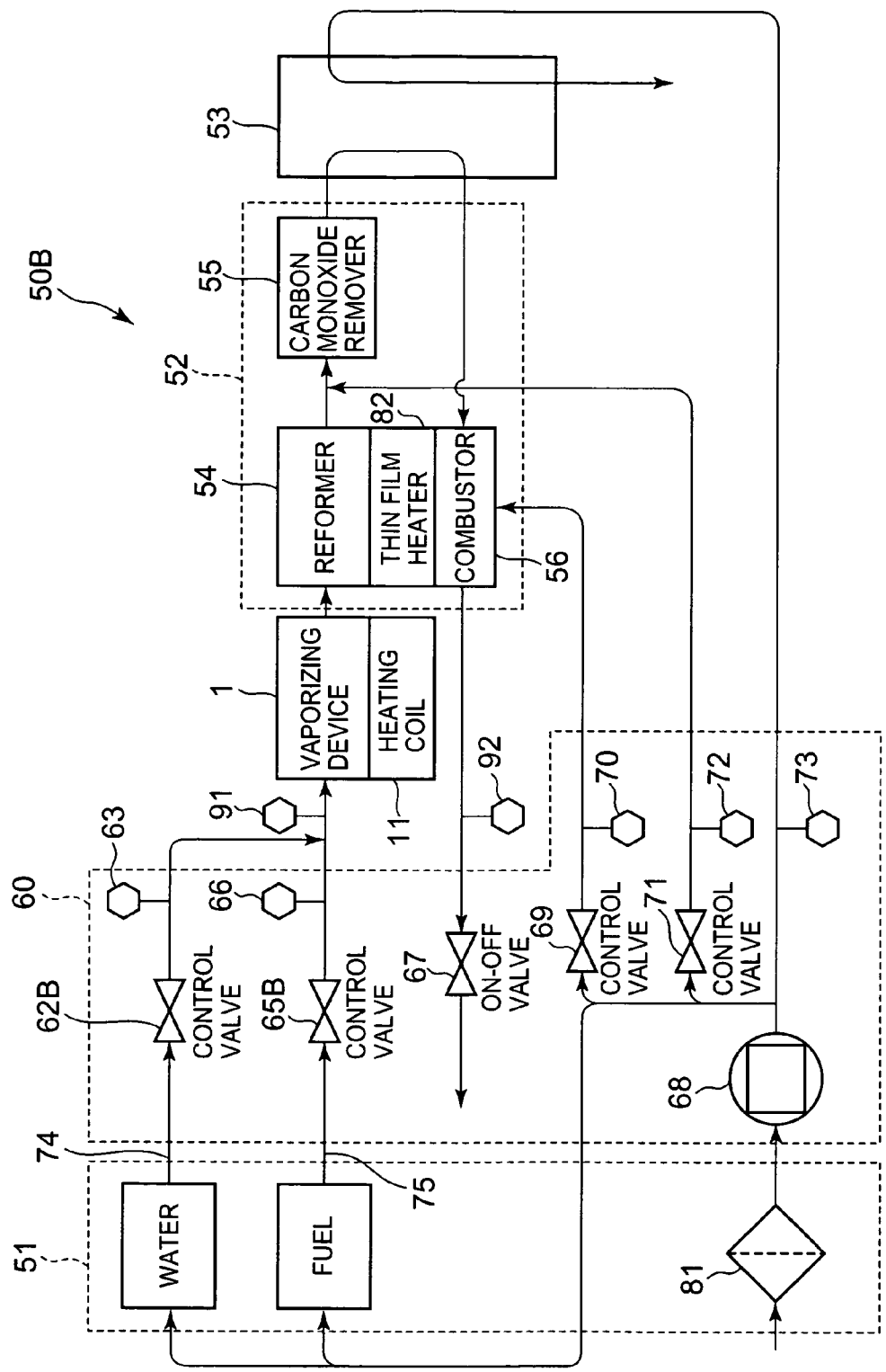
FIG. 6 is a block diagram of power generating device 50B using the vaporizing device 1.

FIG. 6 is a block diagram of power generating device 50B. In FIG. 6, elements of the power generating device 50B that are identical to those of the power generating device 50A shown in FIG. 5 are designated by the same reference numerals.

The power generating device 50B is provided with control valves 62B and 65B in place of ON-OFF valves 62 and 65.

The pumps 61 and 64 are not installed on the power generating device 50B. Instead, air is sent to a water tank and fuel tank provided of the fuel reservoir 51 by the pump 68 through a back-pressure pipe 76. By controlling the amount of the air being sent, the water is supplied to the vaporizing device 1 from the fuel reservoir 51 through the control valve 62B, the liquid fuel is supplied to the vaporizing device 1 from the fuel reservoir 51 through the control valve 65B, and the pressure measured at pressure sensor 91 is controlled. The control valve 62B serves to regulate the total liquid amount of the water supplied to the vaporizing device 1, and the control valve 65B serves to regulate the total liquid amount of liquid fuel supplied to the vaporizing device 1.

The control circuit of the power generating device 50B controls the control valves 62B and 65B based on the pressure signals fed back from the pressure sensor 91 and pressure sensor 92. The control circuit controls the control valves 62B and 65B so that the pressure of the liquid mixture supplied to the vaporizing device 1 becomes equivalent to the pressure of the gas mixture supplied to the reformer 54, or the both pressures to be kept constant. Here, the pressure sensor 92 can be installed between the vaporizing device 1 and the reformer 54, between the reformer 54 and the carbon monoxide remover 55, or between the carbon monoxide remover 55 and combustor 56.

In a case where control to avoid such difference in pressures is not performed, when at least either of the pressure measured by the pressure sensor 91 or the pressure measured by the pressure sensor 92 changes, extrusion force of the liquid in the liquid absorbing member 2 changes due to the pressure difference caused by such change in pressure. Therefore, the amount of vaporization at the liquid absorbing member 2 was not steady. In addition, a load power, in the opposite direction to a force of pulling liquid under influence of a capillary action in the liquid absorbing member 2, works in the fuel reservoir 51 and suppresses the force of pulling liquid under influence of a capillary action. Therefore, the amount of vaporization at the liquid absorbing member 2 was not steady.

In the present embodiment, even in a case where either of the pressure measured by the pressure sensor 91 or the pressure measured by the pressure sensor 92 increases or decreases, or the load power works in the fuel reservoir 51, pressures at the introduction side and discharging side of the liquid absorbing member 2 are kept constant to balance out such occurrences. Therefore, the amount of vaporization is kept constant by the liquid pulling force under influence of a capillary action. Here, the pressures at the introduction side and discharging side of the liquid absorbing member 2 do not always have to be equivalent, but as long as these pressures are kept constant, the amount of vaporization can be kept constant.

Figure 7:
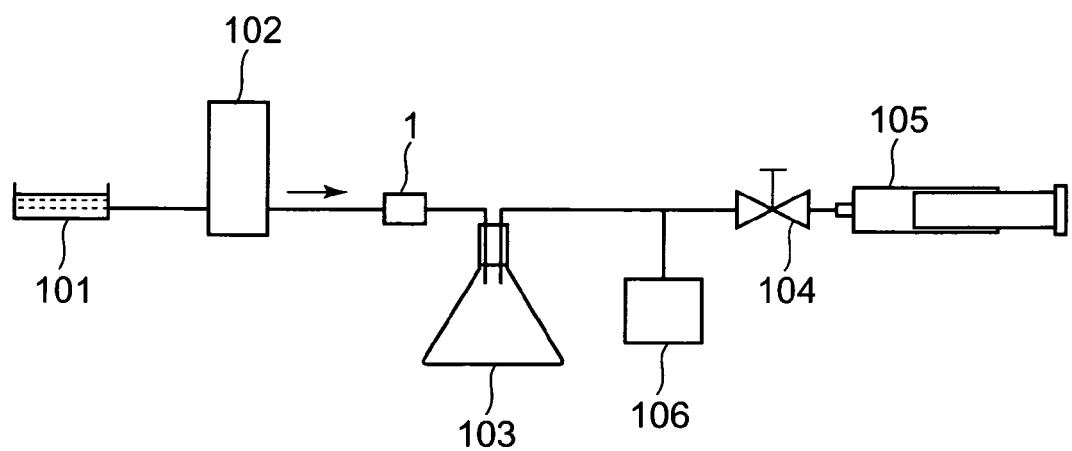
FIG. 7 is a schematic view showing experimental equipment for studying a relationship between pressure at the discharging side of the vaporizing device 1 and amount of vaporization.

A relationship between the pressure at the discharging side and the amount of vaporization in the vaporizing device 1 was obtained by experiments. FIG. 7 is a schematic view showing experimental equipment, which is prepared so that a pressure difference occurs, for a comparison purpose. As shown in FIG. 7, a fuel tank 101 is connected to a mass flow meter 102 through a tube, and the mass flow meter 102 is connected to the inlet nipple 5 of the vaporizing device 1, and the outlet nipple 6 of the vaporizing device 1 is connected to a flask 103. Meanwhile, an injector 105 is connected to the flask 103 through a valve 104, and a pressure gage 106 is connected to the flask 103. A solution of 60 wt % methanol is poured into the fuel tank 101, and absorbed by the liquid absorbing member 2 in the vaporizing device 1 under influence of a capillary action. The fuel tank 101 is placed in open air and kept at atmospheric pressure, so the difference between pressure at the discharging side and pressure at the introduction side of the vaporizing device 1 varies as vaporization progresses.

Figure 8:
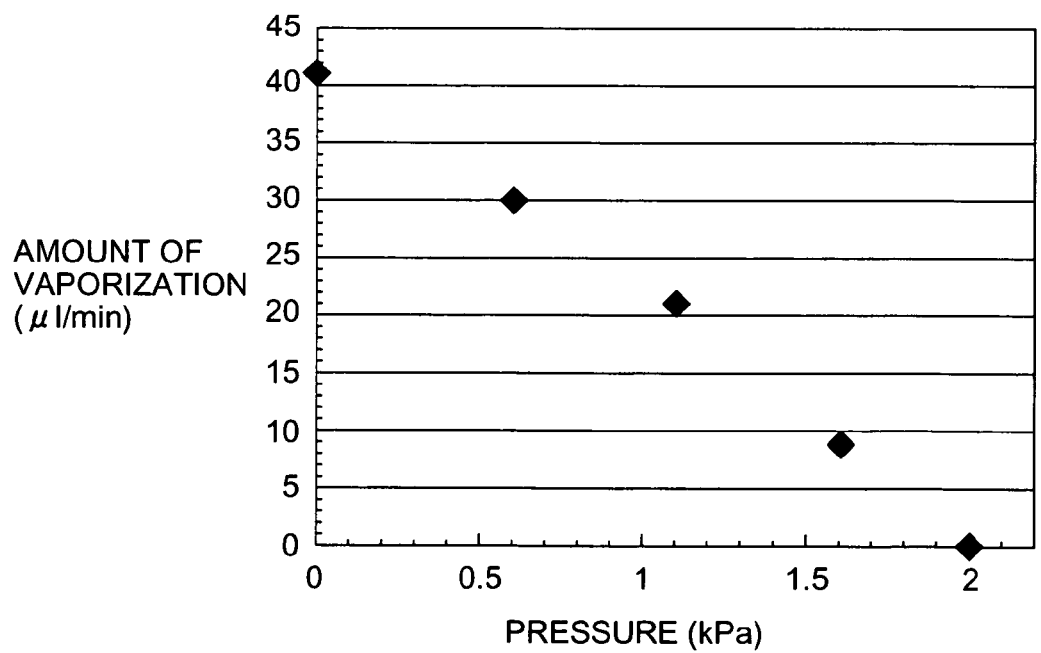
FIG. 8 is a graph showing the result of the experiment performed by the experimental equipment shown in FIG. 7.

In this experimental equipment, the pressure at the discharging side of the vaporizing device 1 was regulated with the injector 105, the pressure was measured with the pressure gage 106, and a flow rate of methanol solution was measured with the mass flow meter 102. The results of the measurement are shown in FIG. 8. As is clear from FIG. 8, as the pressure at the discharging side of the vaporizing device 1 increases, that is, as the pressure at the discharging side of the vaporizing device 1 exceeds the pressure at the introduction side according to the progress of vaporization, the flow rate of the methanol solution decreases, whereby amount of vaporization of the methanol solution per unit time decreases.

Figure 9:
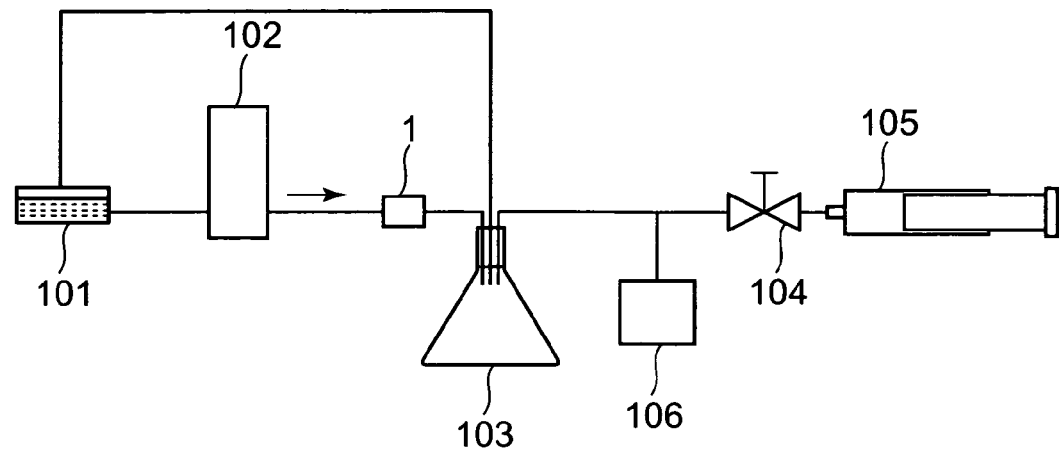
FIG. 9 is a schematic view showing another experimental equipment for studying a relationship between pressure at the discharging side of the vaporizing device 1 and amount of vaporization.
Figure 10:
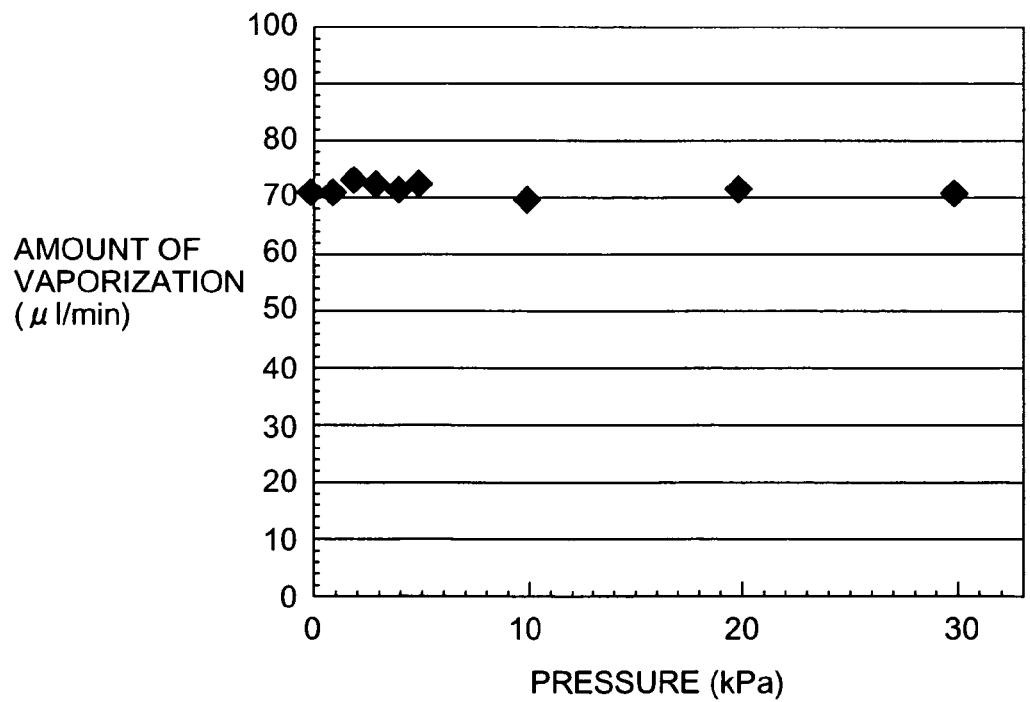
FIG. 10 is a graph showing the result of the experiment performed by the experimental equipment shown in FIG. 9.

Meanwhile, in experimental equipment shown in FIG. 9, the fuel tank 101 is kept airtight. Since the fuel tank 101 is connected to the flask 103 through a tube, the pressure at the discharging side of the vaporizing device 1 is kept equivalent to the pressure at the introduction side. In this experimental equipment, the pressure at the discharging side of the vaporizing device 1 was regulated with the injector 105, pressure was measured with the pressure gage 106, and a flow rate of methanol solution was measured with the mass flow meter 102. The results of the experiment are shown in FIG. 10. As is clear from FIG. 10, even in case where the pressure at the discharging side of the vaporizing device 1 changes, the pressure at the discharging side of the vaporizing device 1 is kept equivalent to the pressure at the introduction side, whereby the flow rate of the methanol solution does not change, and amount of vaporization of the methanol solution per unit time is kept constant at a high level.

In both of the above experiments, the heating coil 11 generates the same amount of heat.

What is claimed is:

1. A vaporizing device comprising:
   a liquid absorbing member which allows liquid to move from a first end portion to a second end portion of the liquid absorbing member under influence of capillary action; and
   a heater to heat a side of the second end portion of the liquid absorbing member to vaporize the liquid;
   wherein the liquid absorbing member comprises a material having heat conductivity of 0.5 W/m·K or less.

2. The vaporizing device according to claim 1, wherein the liquid absorbing member comprises at least one of a felt core, a ceramic porous core, and a fiber core.

3. The vaporizing device according to claim 1, wherein the liquid absorbing member comprises a closely overlapping unit which covers a peripheral surface of the liquid absorbing member and which leaves the first end portion and the second end portion of the liquid absorbing member exposed.

4. The vaporizing device according to claim 3, wherein the closely overlapping unit has elasticity.

5. The vaporizing device according to claim 3, wherein the closely overlapping unit has heat shrinkability.

6. The vaporizing device according to claim 1, wherein the heater comprises an electrically heating wire.

7. The vaporizing device according to claim 1, further comprising a gas permeable film provided at the second end portion of the liquid absorbing member.

8. The vaporizing device according to claim 7, wherein the gas permeable film includes polytetrafluoroethylene or polyvinylidene-fluoride.

9. The vaporizing device according to claim 1, further comprising:
   a case which houses the liquid absorbing member; and
   a pressure controlling section to regulate a difference between a pressure at a side of the first end portion of the liquid absorbing member and a pressure at a side of the second end portion of the liquid absorbing member to be constant.

10. The vaporizing device according to claim 9, wherein the pressure controlling section regulates the pressure at the side of the first end portion of the liquid absorbing member and the pressure at the side of the second end portion of the liquid absorbing member to be equivalent to each other.

11. The vaporizing device according to claim 9, further comprising:
   a supplying section to supply liquid to the side of the first end portion of the liquid absorbing member; and
   a measuring section to measure the pressure at the side of the first end portion of the liquid absorbing member and the pressure at the side of the second end portion of the liquid absorbing member.

12. The vaporizing device according to claim 11, wherein the measuring section measures a pressure applied to liquid at the side of the first end portion of the liquid absorbing member and a pressure of gas at the side of the second end portion of the liquid absorbing member.

13. The vaporizing device according to claim 1, further comprising a case which houses the liquid absorbing member with a cavity provided at the first end portion of the liquid absorbing member.

14. The vaporizing device according to claim 13, wherein a cross-sectional area of the cavity is larger than an area of an end surface of the first end portion of the liquid absorbing member.

15. The vaporizing device according to claim 13, wherein the case is provided with an introduction hole leading to the cavity, and a cross-sectional area of the introduction hole is smaller than a cross-sectional area of the cavity.

16. A vaporizing device comprising:
   a liquid absorbing member which allows liquid to move from a first end portion to a second end portion of the liquid absorbing member under influence of capillary action; and
   a heater to heat a side of the second end portion of the liquid absorbing member to vaporize the liquid;
   wherein the liquid absorbing member comprises a closely overlapping unit which covers a peripheral surface of the liquid absorbing member and which leaves the first end portion and the second end portion of the liquid absorbing member exposed; and
   wherein the closely overlapping unit has elasticity.

17. A vaporizing device comprising:
   a liquid absorbing member which allows liquid to move from a first end portion to a second end portion of the liquid absorbing member under influence of capillary action; and
   a heater to heat a side of the second end portion of the liquid absorbing member to vaporize the liquid;
   wherein the liquid absorbing member comprises a closely overlapping unit which covers a peripheral surface of the liquid absorbing member and which leaves the first end portion and the second end portion of the liquid absorbing member exposed; and
   wherein the closely overlapping unit has heat shrinkability.

* * * * *